M. KUHN & R. NETTER.
TAXIMETER.
APPLICATION FILED APR. 27, 1911.
1,039,416.
Patented Sept. 24, 1912.
5 SHEETS—SHEET 3.
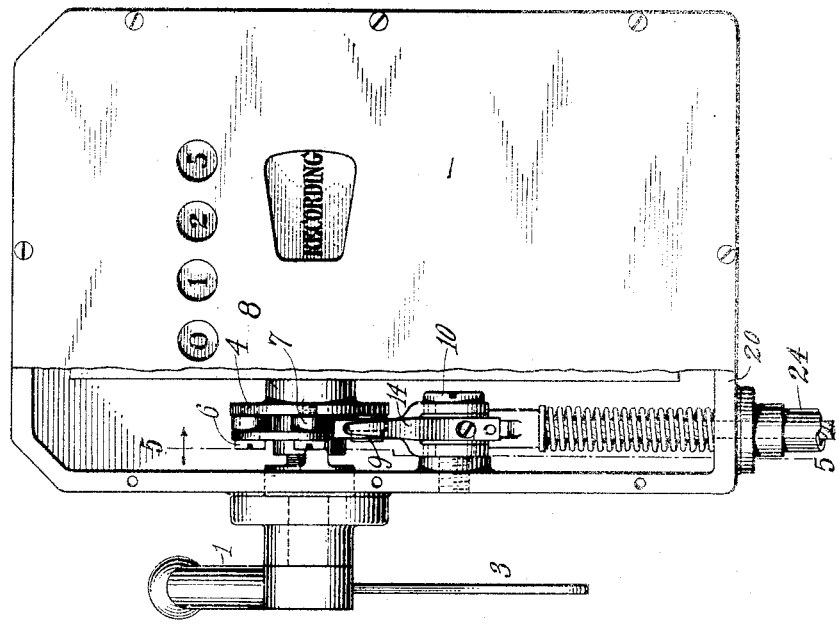
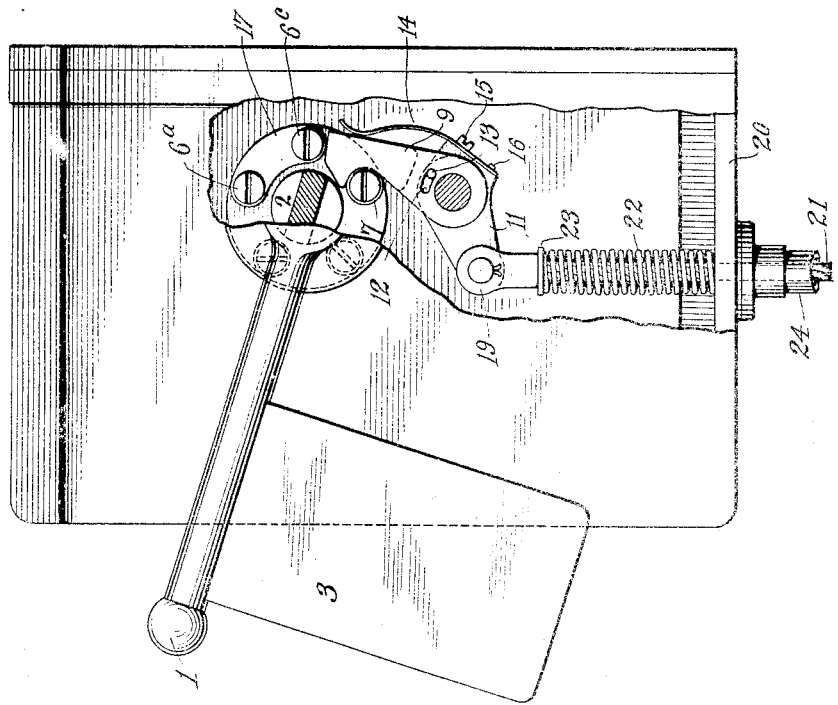
Witnesses:
A. R. Appleman
J. M. H. Hankins
Inventors
Max Kuhn &
Raphaël Netter
by Henry Schreiter
their Atty.

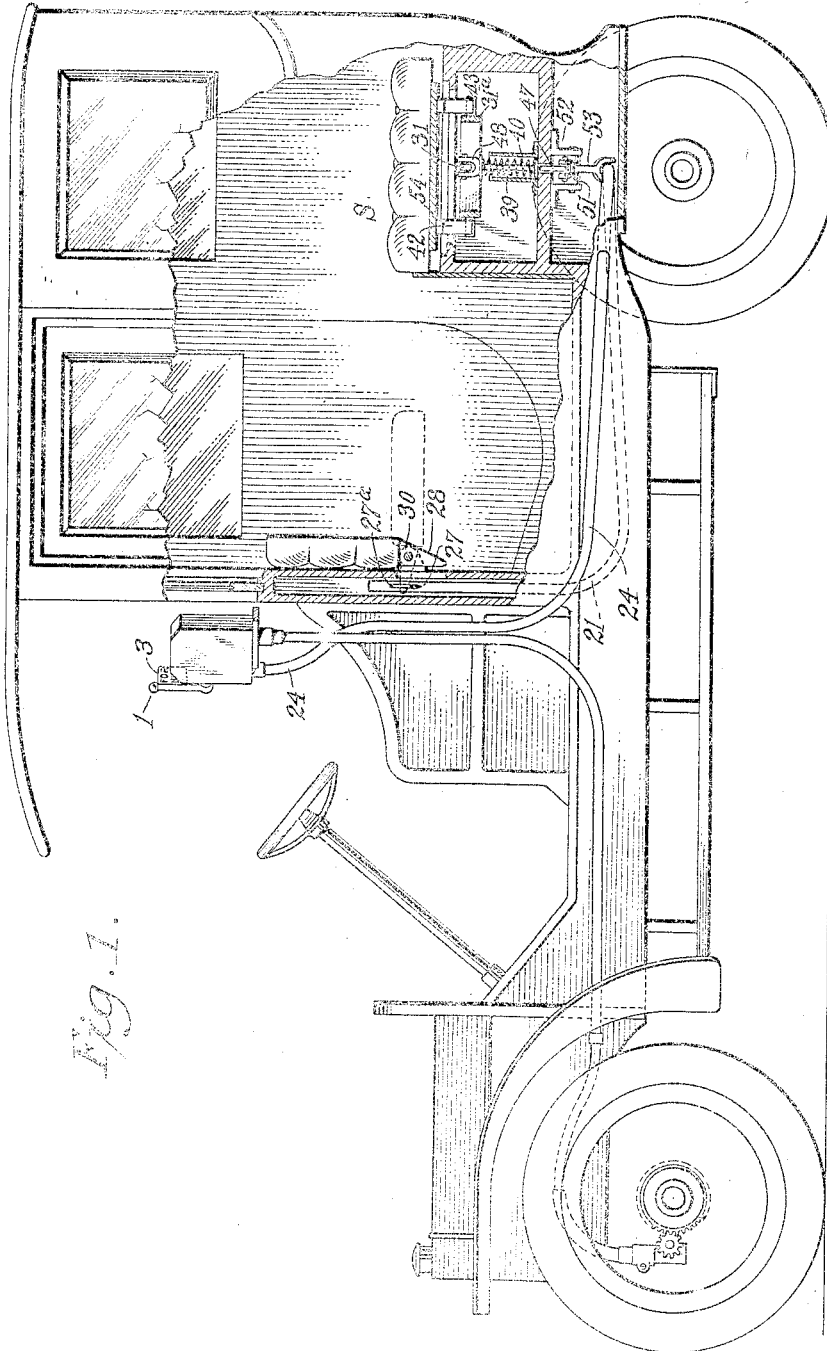

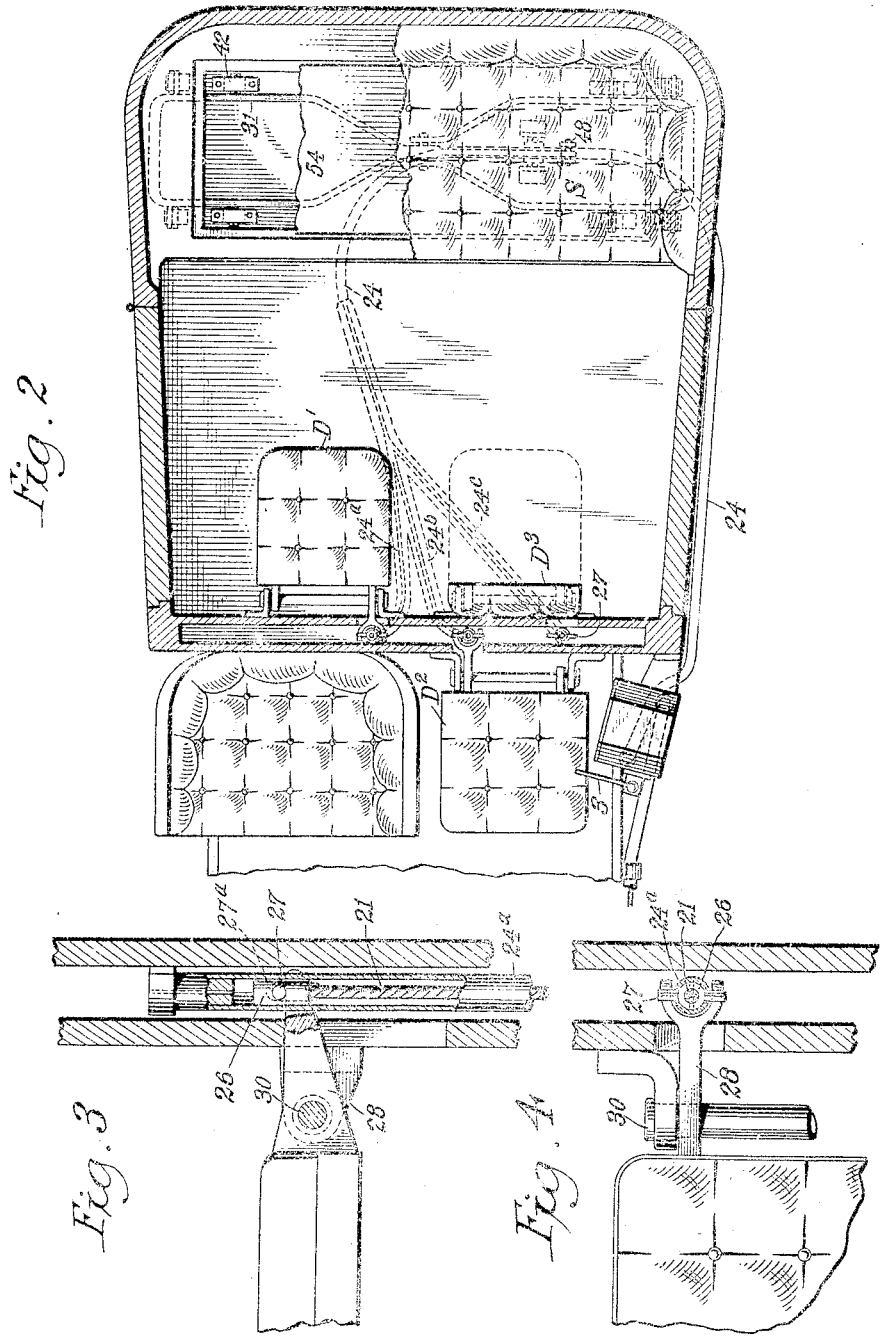

M. KUHN & R. NETTER.
TAXIMETER.
APPLICATION FILED APR. 27, 1911.
1,039,416.
Patented Sept. 24, 1912.
5 SHEETS—SHEET 4.
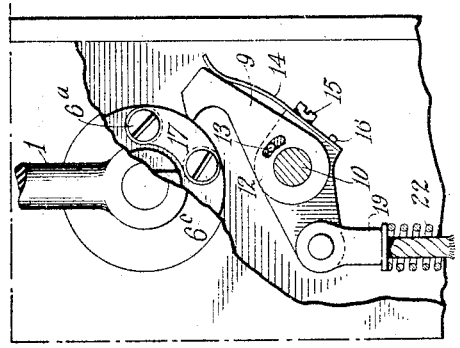
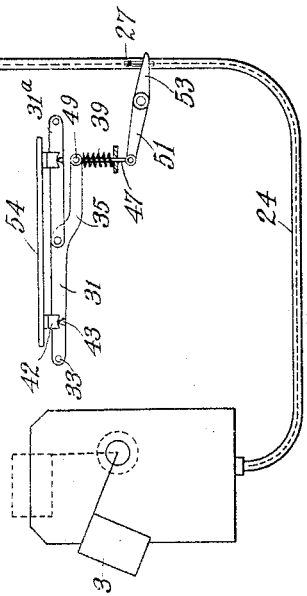
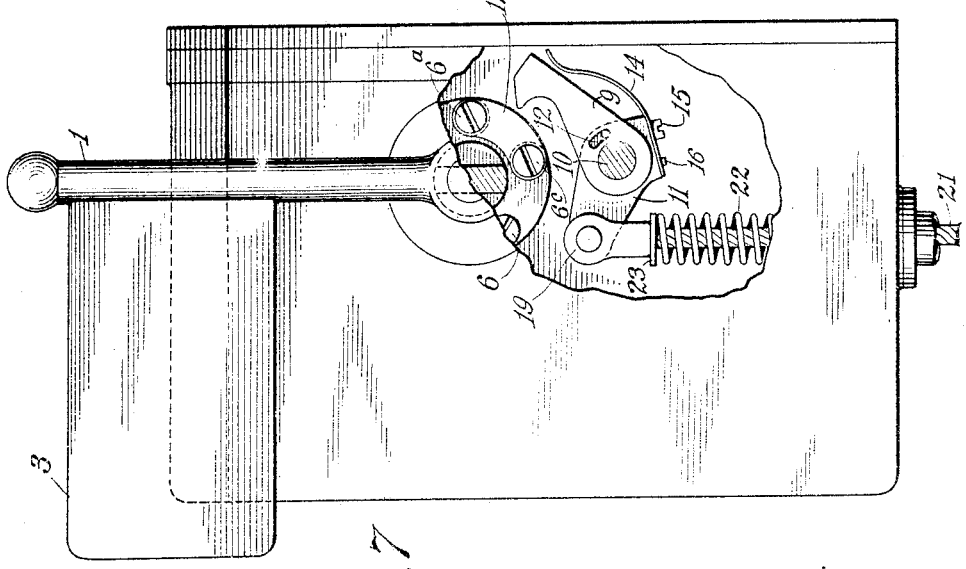
Witnesses:
A. R. Appleman
W. H. Hankins
Inventors
Max Kuhn &
Raphaël Netter
by Henry Schreiter,
their atty.

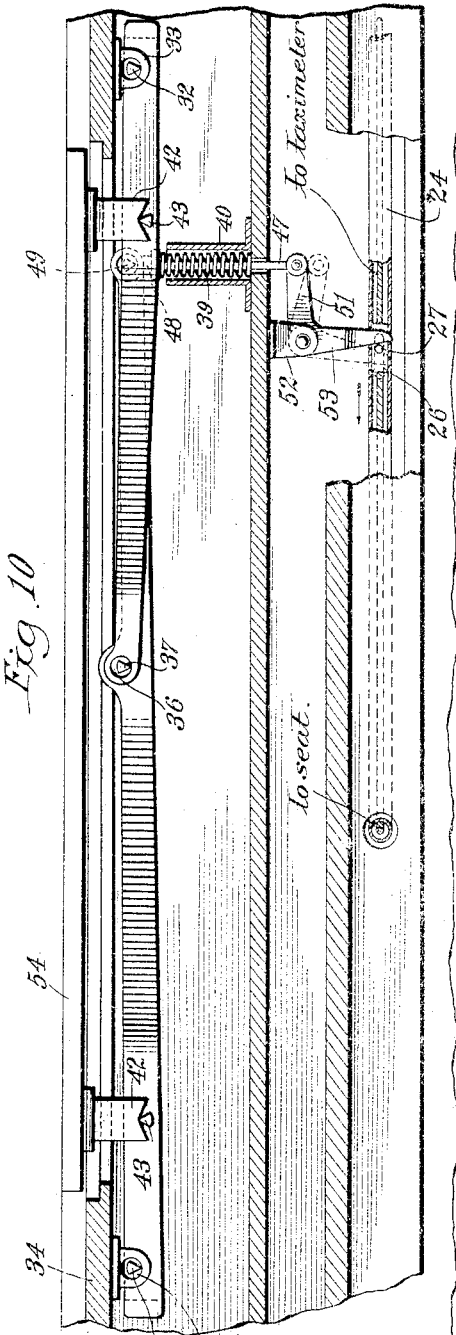
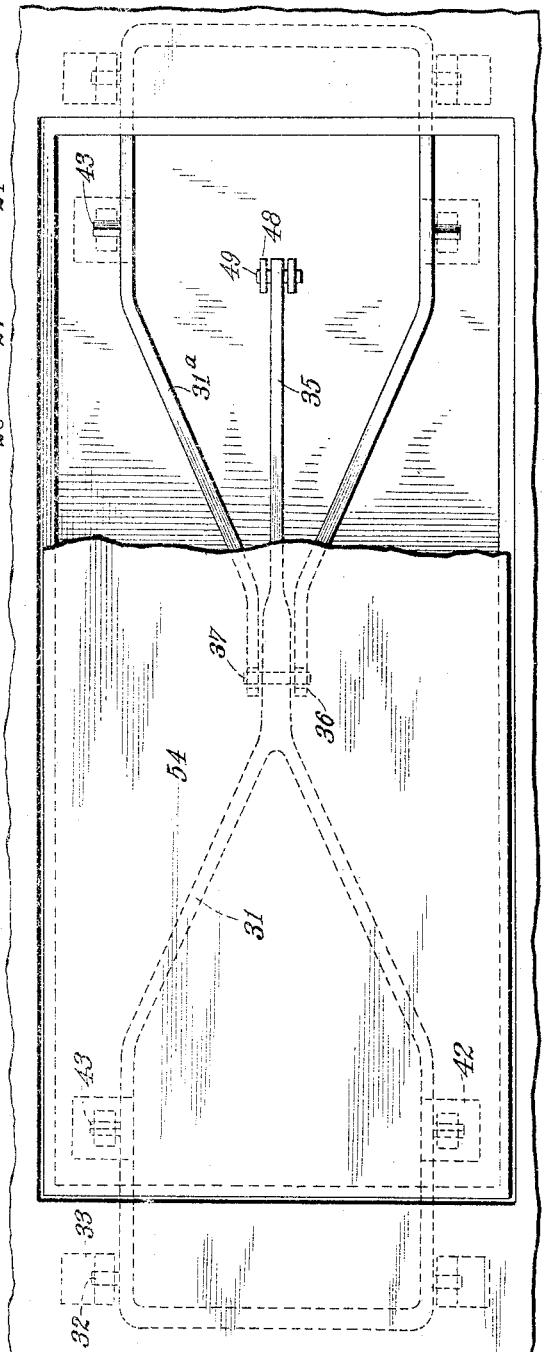

UNITED STATES PATENT OFFICE.

MAX KUHN AND RAPHAËL NETTER, OF NEW YORK, N. Y.; SAID NETTER ASSIGNOR TO SAID KUHN.

TAXIMETER.

1,039,416.  Specification of Letters Patent.  Patented Sept. 24, 1912.

Application filed April 27, 1911.  Serial No. 623,586.

*To all whom it may concern:*

Be it known that we, MAX KUHN, a citizen of the United States, and RAPHAËL NETTER, a citizen of the Republic of France, both residing in the borough of Manhattan, city, county, and State of New York, have invented new and useful Improvements in Devices known as "Taximeters," of which the following is a full, clear, and exact specification, reference being had to the accompanying drawings, illustrating a device constructed according to our invention, and wherein—

Figure 1 is an elevation, partly in section, of an automobile car, part of one side of the car being broken out, to disclose the arrangement of some parts of the device; Fig. 2 is a plan view, partly in section; and Figs. 3 and 4 are detail views, drawn on an enlarged scale; Fig. 3 being a side elevation, partly in vertical section, and Fig. 4, a plan view, partly in horizontal section, of the details of the mechanism for setting the locking device in action by the folding seats of the vehicle; Fig. 5 is a front elevation, and Fig. 6 a side view of the mechanism for locking the shaft of the fare registering device in "recording" position, the parts thereof being shown in their positions, locking the shaft; Fig. 7 is a view similar to that shown in Fig. 5, but showing the shaft of the fare registering device in "non-recording" position, and the locking mechanism disengaged therefrom; Fig. 8 is a view similar to Fig. 7, but showing the shaft of the fare registering device in "non-recording" position, the same as in Fig. 7, but showing the locking mechanism set to snap in and to lock the shaft when turned into "recording" position; Fig. 9 is a diagram of the mechanism for setting the locking device in action, and of its connections; Fig. 10 is an elevation, partly in section, and Fig. 11, a plan view, of the balancing lever beams, whereon the rear seat of the vehicle is supported; Fig. 10 showing also the mechanism, whereby the locking device is set in action by the depressing of this seat.

Our invention relates to devices, generally designated "taximeters," for recording and indicating the distance traveled by a vehicle, the durations of stops, etc., and for indicating the amount of fare to be paid by the passenger, and which have their mechanism arranged to be set into a "recording" or "non-recording" position, it being intended that when the vehicle is used by a passenger, the mechanism of the taximeter is to be set in the "recording" position and returned again to its normal, "non-recording" position, when the vehicle is not occupied. This setting of the taximeter in its "recording" and "non-recording" positions, is effected by the driver moving a lever, connected to the shaft of the taximeter, and usually supplemented by a flag or a sign, to indicate that the vehicle is hired, or open for hire. The drivers of such "taxi-cabs" are instructed, and are supposed to turn the shaft of the taximeter into the "recording" position immediately when the vehicle is hired, and to keep it there as long as the vehicle is used in the service of the passenger. In practice, however, they sometimes carelessly, or even intentionally, turn back the shaft, while the vehicle is yet occupied by the passenger, thus returning the operating mechanism of the fare recording device to its "non-recording" position. This leads to dispute between the passenger and the driver, as to the amount of the fare to be paid, the driver pretending that the taximeter is out of order and demanding that the passenger disregard the amount of fare indicated and pay what the driver demands; dishonest drivers also make use of such an occurrence, to cheat the owner of the vehicle in accounting for the pay they collected for the service.

The object of our invention is to prevent the possibility of the taximeter being returned into its "non-recording" position, while the vehicle is engaged in the service of a passenger, and our invention consists in devising the herein shown device for automatically locking the shaft of the fare recording device when its mechanism is set in the "recording" position, and for holding it locked in that position, beyond the control of the driver, as long as the vehicle is occupied by a passenger.

As shown in the accompanying drawings, our locking device is adapted to the type of taximeters used on the vehicles commonly designated as "taxi-cabs." In these taximeters there is a flanged sleeve 8, rigidly secured to the taximeter shaft 2 and on the flange 4 of this sleeve there are rollers 7, rotatably mounted on the stems of screws 6, screwed therein. These rollers are spaced apart correspondingly to the steps of the motions of the shaft, and we make use of this arrangement in designing our locking device, as shown in detail in Figs. 5, 6, 7 and 8, showing our locking device in its active and inactive positions.

The bolt 9 of the locking device is turnably mounted on stud 10, whereon also lever 11 is fulcrumed. Lever 11 and bolt 9 are operatively connected by the arc-shaped slot 12, made in the bolt 9, and the pin 13, set in lever 11; pin 13 engages in the slot 12 (see Fig. 7), and moves the bolt 9 to or from the taximeter shaft, according to which way lever 11 is swung. Spring 14, secured to the stunted arm of lever 11, by screw 15, and held in alinement with the bolt 9 by pin 16, is set against the hook-shaped head of bolt 9, pressing it into engagement with the rollers 7, as shown in Fig. 5, when the other arm of lever 11 is pulled down, as shown in Figs. 5 and 8. It is not in contact with bolt 9 when the locking device is in the position shown in Fig. 7, in which the bolt 9 is held inactive and away from the shaft 2 of the taximeter. The free end of lever 11 is connected by the bifurcated loop-head 19 to the pull-cord 21, whereby the locking device is set, and the spring 22 slid thereon, between the bottom plate 20 of the taximeter casing and the flange 23 of the loop-head 19, returns it to the position shown in Fig. 7 when the pull on the cord 21 is released.

The locking of the shaft 2 is effected by the hook-shaped head of the bolt 9, fitted to enter between, and to engage with, the adjoining rollers 7, when sprung in, as shown in Fig. 5, whereby the shaft 2, after being turned, by moving lever 1, to set the taximeter into its "recording" position, is locked. When the shaft 2 is thus locked, the lever 1 cannot be moved until the bolt 9 is again withdrawn. To prevent the locking of the taximeter shaft in the "non-recording" position, the block or bridge 17 is set on screws $6^a$ and $6^c$, so as to partly fill the space between them, and this prevents bolt 9 from entering (snapping) into the space between the rollers mounted on these screws. This bridge 17 stands against (see Fig. 8) the bolt 9 when the shaft 2 of the taximeter is turned to hold its mechanism in "non-recording" position, and as it prevents the hook 9 from entering between the rollers, the shaft 2 of the taximeter cannot be locked in this position.

The pull-cord 21 is connected with the seats of the vehicle in such manner that, by occupying any of the seats, the passenger sets the locking device in action, automatically effecting the locking of the taximeter shaft, if then, or thereafter, the mechanism of the taximeter is set in its "recording" position. After being thus locked, the shaft 2 cannot be disengaged or released from this locking device and the mechanism of the taximeter is held in its "recording" position, as long as any one of the seats of the vehicle remains occupied. Pull-cord 21 is incased in tube 24, led, as shown in Figs. 1 and 2, on the bottom of the carriage body, underneath the stationary seat S, and from there underneath the flooring toward the front of the vehicle, where the so-called "drop-seats" are hinged to the body of the vehicle. After passing the seat S, the tube 24 and the pull-cord 21 are split into three branches $24^a$, $24^b$, and $24^c$, each one of these three branches being led, between the walls of the front side of the carriage body, to one of the drop seats D′, $D^2$ and $D^3$ (see Fig. 1). At or near the level of these seats, longitudinal slots $27^a$ are provided in each branch $24^a$, $24^b$ and $24^c$ of the tube 24, and blocks 26 are secured to the pull-cord 21, wherein cross-pins 27 are set in, projecting on both sides through the said slots $27^a$. To each of the drop seats D′, $D^2$ and $D^3$, an arm 28 is secured, or made integral therewith as an extension of one of the hinge parts, to act as levers, fulcrumed on the hinge-bolts 30 of these seats. The forked ends of arms 28 straddle the branches $24^a$, $24^b$ and $24^c$ of the pull-cord tube, and engage the projecting ends of the cross-pins 27 (see enlarged details, Figs. 3 and 4), when the seats D′, $D^2$ or $D^3$ are dropped, thereby drawing upon the pull-cord 21 and lever 11 of the locking device. Spring 22 is made sufficiently strong to resist this pull on the cord 21 and to maintain the locking device in the position shown in Fig. 7, as long as none of the seats is occupied. When, however, a passenger sits down on any of the seats, his weight overcomes the resistance of spring 22, and brings the seat in the position shown in Fig. 3. The spring 22 is then compressed, lever 11 pulled down and bolt 9 is brought in the position shown in Fig. 8. In this position the locking mechanism is set to lock the taximeter shaft as explained.

The mechanism for setting the taximeter locking device in its operative position, by the depressing of the rear, or main, seat S of the vehicle, is illustrated in Figs. 10 and 11. This seat S is set upon a balancing lever frame, which is operatively connected with one arm of a bell-crank, whose other arm engages the cross-pin 27 and acts on the pull-cord 21 in the same way as the arms 28 of the drop-seats described above. The balancing lever frame is devised to effect this action when this seat S is occupied by only one passenger, and irrespectively, whether he sits in the center or on either end of the seat. It is arranged as follows: Two frame-shaped levers 31 and $31^a$ are suspended on wedge-shaped cross-pins 32, in the bearings 33, secured to the frame 34 of the seat-box; their arms converge toward each other, the ends of one (31) are joined together and formed into a tongue 35, wherein a wedge-shaped cross-pin 37 is fixed; the ends of the other (31ª) are conformably shaped to embrace the tongue 35 and are pivotally connected to it, by the cross-pin 37 engaging in the bearings 36, provided in the ends of this lever 31ª, as shown in Figs. 10 and 11. A bell crank is fulcrumed in lug 52, affixed to the under side of the brace of the seat box, and the end of the tongue 35, extending beyond the balancing connection of the two levers 31 and 31ª is connected to the horizontally disposed arm 51 of the bell-crank lever by the rod 47, whose head 48 is loop-shaped and bifurcated, the wedge-shaped cross-pin 49, fixed in the end of the tongue 35, engaging therein. Thus the balancing lever frame is supported by the spring 39, set in a tubular socket 40, affixed to a brace of the seat-box, and bearing against the flange of the head of rod 47. The seat S is mounted on the balancing lever frame, its four stunted legs 42 affixed to the bottom plate 54 of the seat, engaging the wedge-shaped pins 43, projecting from the sides of the balancing lever frame. Thus this rear seat S is movably supported in such manner, that when a passenger seats himself on any part thereof, the extended arm or tongue 35 is depressed, and overcoming the resistance of the spring 39, acts on the arm 51 of the bell-crank lever pivotally connected thereto by the rod 47, as indicated in Fig. 10 in dotted lines. The other, vertically depending, arm 53 of this bell-crank lever is bifurcated, like the lever arms 28 of the drop seats and engages the cross-pin 27, set in block 26, and whose ends project through the longitudinal slots in the pull-cord tube 24. When the seat S is thus depressed, arm 53 draws the pull-cord 21, whereby the spring 22 of the locking device is depressed, the lever 11 pulled down, and the locking bolt 9 set in its operative position, indicated in Fig. 8, as described before with reference to the action of the lever arms 28 of the drop seats. The mechanism, connected with the seat S, effects the setting of the locking device into its operative position, independently of that connected with the drop seats D′, D² and D³, and equally, the locking device will be set in operative position by a passenger occupying any of the drop seats, independently of the seat S and also of the other drop seats. The locking of the taximeter shaft is thus effected by a passenger occupying any one of the seats and the taximeter is kept in its recording position as long as any of the seats of the vehicle remains occupied.

We claim as our invention:

1. A locking device comprising a shaft provided with means to be engaged by a bolt, a lever, a bolt pivoted thereon, and means on the lever, operatively connecting the bolt therewith; a spring, yieldingly holding the bolt withdrawn from the shaft; a movable seat in the vehicle, and means operatively connecting the seat with the lever, and whereby the bolt is set in position to engage with the means on the shaft, when the seat is depressed; substantially as herein shown and described.

2. A locking device for a taximeter and similar fare registering and indicating devices for vehicles, comprising the shaft of the taximeter, means on the shaft adapted to be engaged by a bolt, to lock the shaft in its position; a bolt, pivotally mounted in position to be moved in engagement with the means on the shaft; mechanism for moving the bolt; a spring set to hold the bolt away from the means on the shaft; movable seats in the vehicle; and means operatively connected therewith and with the mechanism moving the bolt, to set the bolt against the action of the spring in engagement with the means on the taximeter shaft when the seat is depressed, substantially as herein shown and described.

3. A device for locking a taximeter, or other fare registering and indicating device for vehicles, in its "registering" position, comprising a shaft, means on the shaft adapted to be engaged by a bolt to hold the shaft when turned to set the taximeter into its "registering" position; a hook-shaped bolt mounted on a pivot and adapted to engage the means on the shaft; a lever; means operatively connecting the lever with the bolt; a spring acting on the lever to move the bolt away from the shaft; a movable seat in the vehicle and means, operatively connecting the lever therewith, and moving the lever to set the bolt in position to engage with the means on the shaft when the seat is depressed; substantially as herein shown and described.

4. A device for locking a taximeter, or other fare registering and indicating device for vehicles, comprising a shaft, means on the shaft of the taximeter adapted to be engaged by a bolt to hold the shaft when turned to set the taximeter into its "registering" position; a hook-shaped bolt adapted to engage the means on the shaft; a lever; means operatively connecting the lever with the bolt; a spring, secured to the lever and acting on the bolt, when the bolt is moved in position to engage the means on the shaft, to press it into engagement therewith; a spring acting on the lever to move the spring away from the bolt and the bolt away from the shaft; a movable seat in the vehicle and means operatively connecting the lever therewith and moving the lever to set the bolt in position to engage with the means on the shaft and the spring on the lever in position to press the bolt in engagement with the means on the shaft; substantially as herein shown and described.

5. A device for locking a taximeter or other fare registering and indicating device for vehicles, comprising a shaft, means on the shaft adapted to be engaged by a bolt to hold the shaft when turned to set the taximeter into its "registering" position; a hook-shaped bolt mounted on a pivot and adapted to engage the means on the shaft; a two-armed lever; means operatively connecting one arm of the lever with the bolt; a pull cord, connected to the other arm of the lever; a spring, set to stretch the pull cord and to yieldingly hold the lever in position turning the bolt from the means on the shaft; a movable seat in the vehicle, and mechanism connected therewith to draw the pull cord when the seat is depressed, whereby the lever is actuated to set the bolt in position to engage with the means on the shaft; substantially as herein shown and described.

6. A locking device for a taximeter and similar fare registering and indicating devices for vehicles, comprising a shaft, means on the shaft, adapted to be engaged by a bolt, to lock the shaft in its position; a bolt and means yieldingly holding the bolt withdrawn from the shaft; a compound balancing frame in the vehicle; a seat mounted thereon, and mechanism, connected with the balancing frame and with the bolt, and adapted to set the bolt in position to engage the means on the shaft when the seat mounted on the frame is depressed; substantially as herein shown and described.

7. A device for locking a taximeter, or other fare registering and indicating device for vehicles, in its "registering" position, comprising a shaft, means on the shaft adapted to be engaged by a bolt; a hook-shaped bolt mounted on a pivot and adapted to engage the means on the taximeter shaft; a lever; means operatively connecting the lever with the bolt; a spring acting on the lever to move the bolt away from the shaft; a compound balancing frame in the vehicle; a seat mounted thereon, and mechanism connected with the frame and with the lever, and adapted to move the lever to set the bolt in position to engage the means on the taximeter shaft when the seat, mounted on the frame, is depressed; substantially as herein shown and described.

8. The combination with a vehicle, of a fare registering and indicating device; means for locking the device; a compound balancing frame comprising two frame-shaped levers, the ends of one of the levers being extended into an arm and the sides of the other lever being pivotally joined thereto, approximately midway between the ends of the frame; means for swingingly suspending the levers from a fixed part of the seat-box of the vehicle; a seat, set with one end on each of the two levers; a yielding support for the extended arm of one of the levers; mechanism operatively connected with the means for locking the fare registering and indicating device, and means for actuating the mechanism by the extended arm of the frame; substantially as herein shown and described.

9. The combination with a vehicle, of a fare registering and indicating device; a shaft; means for locking the shaft; a movable seat; and means, intermediate the seat and the fare registering and indicating device, for actuating the means, locking the shaft, by depressing the seat; substantially as herein shown and described.

10. The combination, in a vehicle, of a fare registering and indicating device; means for locking the device in its registering position; a compound balancing frame comprising two frame-shaped levers, the ends of one of the levers being extended into an arm, and the sides of the other lever being pivotally joined thereto, approximately midway between the ends of the frame; means for swingingly suspending the levers from a fixed part of the vehicle; a seat mounted on the frame; and means operatively connected with the arm of the frame and the locking device, and operating to lock the fare recording and indicating device by depressing any part of the seat, substantially as herein shown and described.

MAX KUHN.
RAPHAËL NETTER.

Witnesses:
V. BRAUN,
ALFONSE F. SPIEGEL.